J. O. CHARPENTIER.
SMOKE COOLING ATTACHMENT FOR TOBACCO PIPES, &c.
APPLICATION FILED APR. 23, 1915.
1,167,384.
Patented Jan. 11, 1916.
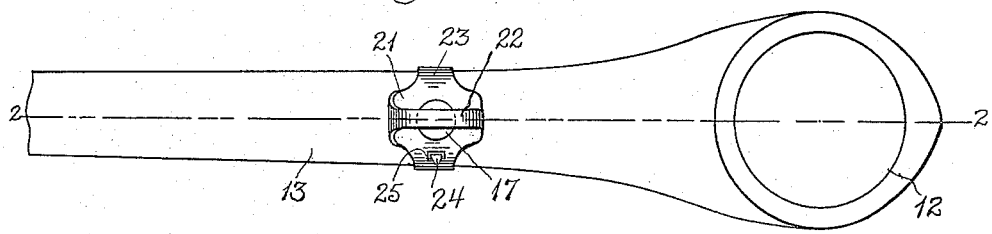
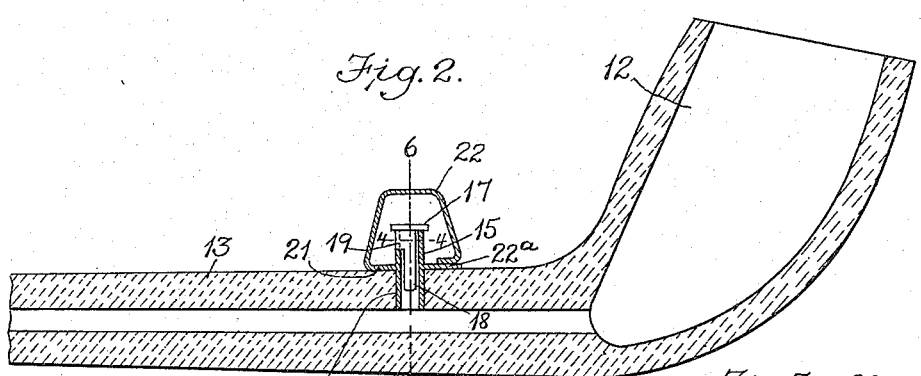
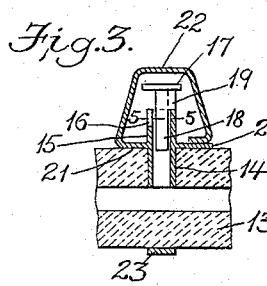
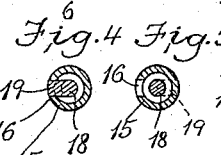
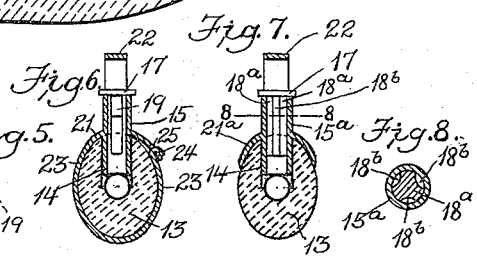
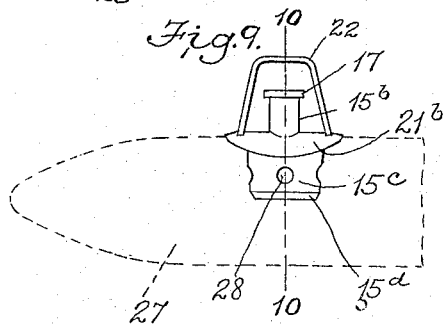
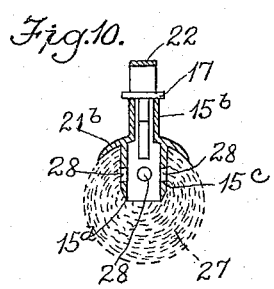
Inventor
J. O. Charpentier
by Wright Brown Quinby May
Attorneys

UNITED STATES PATENT OFFICE.

JOSEPH O. CHARPENTIER, OF CONCORD, NEW HAMPSHIRE.

SMOKE-COOLING ATTACHMENT FOR TOBACCO-PIPES, &c.

1,167,384.  Specification of Letters Patent.  Patented Jan. 11, 1916.

Application filed April 23, 1915. Serial No. 23,336.

*To all whom it may concern:*

Be it known that I, JOSEPH O. CHARPENTIER, a citizen of the United States, and a resident of Concord, in the county of Merrimack and State of New Hampshire, have invented certain new and useful Improvements in Smoke-Cooling Attachments for Tobacco-Pipes, &c., of which the following is a specification.

This invention relates to means for admitting cool air into the stem of a tobacco pipe or of a cigar or cigarette holder, or into the body of a cigar near the inner or mouth end thereof, for the purpose of cooling the smoke drawn into the mouth of the user.

The invention has for its object to provide a simple attachment for the purpose above stated, adapted to be applied to a smoke-conducting stem without requiring change or modification of the stem other than the formation of a small lateral orifice communicating with its bore, the nature of the invention being such that it may be embodied in an attachment adapted to form an orifice in the wrapper of a cigar.

The invention consists in the improvements which I will now proceed to describe and claim.

Of the accompanying drawings, Figure 1 represents a plan view of a pipe provided with an attachment embodying my invention. Fig. 2 represents an enlarged section on the line 2—2 of Fig. 1. Fig. 3 represents a view similar to a portion of Fig. 2, showing the valve hereinafter described in its open position. Fig. 4 represents an enlarged section on the line 4—4 of Fig. 2. Fig. 5 represents an enlarged section on the line 5—5 of Fig. 3. Fig. 6 represents a section on the line 6—6 of Fig. 2. Fig. 7 represents a view similar to Fig. 6 showing a modification. Fig. 8 represents an enlarged section on the line 8—8 of Fig. 7. Fig. 9 represents a side view of an attachment adapted to engage a cigar body. Fig. 10 represents a section on the line 10—10 of Fig. 9.

The same reference characters indicate the same parts wherever they occur.

Referring to Figs. 1 to 6 inclusive, 12 represents the bowl and 13 the stem of a tobacco pipe which may be of any desired form. For the purposes of my invention, 12 may be the socket portion of a cigar or cigarette holder. In the stem 13 is formed a small lateral orifice 14 communicating with the bore of the stem and preferably located close to the bowl.

15 represents a tube or nipple formed to have a close frictional fit in the orifice 14, the outer end of the nipple projecting from the stem. In the preferred embodiment of the invention, the nipple has a longitudinal slot 16 in its outer end portion.

17 represents a valve formed to be seated on the outer end of the nipple, and provided with a stem 18 loosely fitting and movable endwise in the nipple. In the preferred embodiment, the valve is provided with an extension 19 formed by a wing on the stem 18, and closely fitting and closing the slot 16 when the valve is seated on the nipple. The lower end of said extension or wing forms a shoulder adapted to bear on the outer end of the nipple and hold the valve open as shown by Fig. 3, when the valve is moved outwardly to withdraw the extension from the slot, the valve being partly turned to move the extension out of alinement with the slot. When the valve is open, cool air is drawn by the smoker through the nipple and mingles with the hot smoke-laden air drawn from the bowl.

The nipple is provided with a flange 21 formed to bear on the stem 13 and limit the entrance of the nipple into the orifice 14, said flange being soldered or otherwise connected with the nipple between its ends and being curved to fit the stem. The flange 21 is utilized to connect with the nipple a stop 22 projecting outwardly from the nipple across the path of the valve and arranged to limit the opening movement of the valve, and prevent the withdrawal of the stem 18 from the nipple as shown by Fig. 3. Said stop is preferably an elongated ear or strip integral with the flange, and bent to form a loop or arch crossing the path of the valve, one of its ends being soldered or otherwise secured to the flange at 22ª. The nipple may be secured in place only by friction due to the closeness of its fit in the orifice 14. I prefer, however, to provide additional securing means here shown as a flexible elongated ear or strip 23 integral with the flange 21 and bent as shown by Fig. 6 to form a clasp embracing the stem 13, the free end of said ear being detachably connected with the flange by a hook 24 entering a slot 25 in the flange.

It will now be seen that a pipe or other like article may be provided with a smoke-cooling attachment embodying my invention, by simply boring the small orifice 14 in the stem, and then inserting the nipple 15 in said orifice, the attachment being additionally secured or not as may be desired. The attachment is self contained, the valve being prevented from removal from the nipple by a part of the attachment, and the means for securing the nipple to a stem being carried wholly by the attachment.

Figs. 7 and 8 show a modification showing a nipple 15ª provided with a flange 21ª without the clasp ear 23, and also showing the valve provided with a stem 18ª having a sufficiently close frictional fit in the nipple to hold the valve open by friction. In this modification, the slot 16 in the nipple and the valve extension or wing 19 are omitted and the stem 18ª is provided with longitudinal grooves 18ᵇ forming air passages.

Figs. 9 and 10 show an attachment embodying the invention adapted to be detachably engaged with a cigar. This embodiment of the invention includes a nipple 15ᵇ having an inner end portion 15ᶜ which is preferably elliptical and is sharpened to form a cutting edge 15ᵈ, said portion 15ᶜ constituting a cutting die or punch adapted to form an orifice for the reception of the attachment in the wrapper and binder portions of a cigar 27. The nipple is provided with a flange 21ᵇ which limits the entrance of the nipple into the cigar. In applying the attachment to a cigar, the cutting end of the nipple is first forced through the wrapper and into the binder and filler portions of the cigar, and then removed to withdraw the cutout portions of the cigar and leave an orifice or socket for the reception of the nipple. The tobacco remaining in the nipple is then removed therefrom and the nipple is inserted in said orifice. The nipple portion 15ᶜ is preferably provided with air holes 28. I have found that this attachment causes a cigar to burn more slowly, and increases the enjoyment of the cigar by the smoker.

The attachment may be made of any suitable material, preferably aluminum.

In practice, the valve is closed when the tobacco is being ignited, so that the entire draft is through the tobacco, the valve being opened when cooling is desired.

I claim:

1. A smoke cooling attachment comprising an air-conducting nipple insertible in an orifice formed in a smoke-conducting body, a valve adapted to be seated on the outer end of said nipple and having a stem which is movable endwise in the nipple, and a stop connected with the nipple and projecting outwardly therefrom across the path of the valve to limit the opening movement of said valve.

2. A smoke cooling attachment comprising an air-conducting nipple insertible in an orifice formed in a smoke-conducting body, and provided with a slot in its outer end portion, said slot communicating with the air passage through the nipple, a valve adapted to be seated on the outer end of said nipple and provided with a stem which is movable endwise in the nipple, said valve being formed to close the outer end of the nipple and having a slot-closing extension, one end of said extension forming a shoulder adapted to hold the valve open, and a stop connected with the nipple and adapted to limit the opening movement of the valve.

3. A smoke cooling attachment comprising an air-conducting nipple insertible in an orifice formed in a smoke-conducting body, a valve adapted to be seated on the outer end of said nipple and having a stem which is movable endwise in the nipple, and a stop connected with the nipple and projecting outwardly therefrom across the path of the valve to limit the opening movement of said valve, said nipple being provided with a flange adapted to limit the entrance of the nipple into said opening.

4. A smoke cooling attachment comprising an air-conducting nipple insertible in an orifice formed in a smoke-conducting body, a valve adapted to be seated on the outer end of said nipple and having a stem which is movable endwise in the nipple, and a stop connected with the nipple and adapted to limit the opening movement of said valve, said nipple being provided with a flange adapted to limit its entrance into said opening and with a flexible ear adapted to form a stem-embracing clasp.

In testimony whereof I have affixed my signature, in presence of two witnesses.

JOSEPH O. CHARPENTIER.

Witnesses:
  HENRY ROBINSON,
  J. JOSEPH DOHERTY.

Copies of this patent may be obtained for five cents each, by addressing the "Commissioner of Patents, Washington, D. C."